July 6, 1926.
R. D. LENTZ
1,591,135
AUTOMATICALLY OPERATING MECHANISM FOR ELEVATING LIQUIDS
Filed Oct. 31, 1925      4 Sheets-Sheet 1
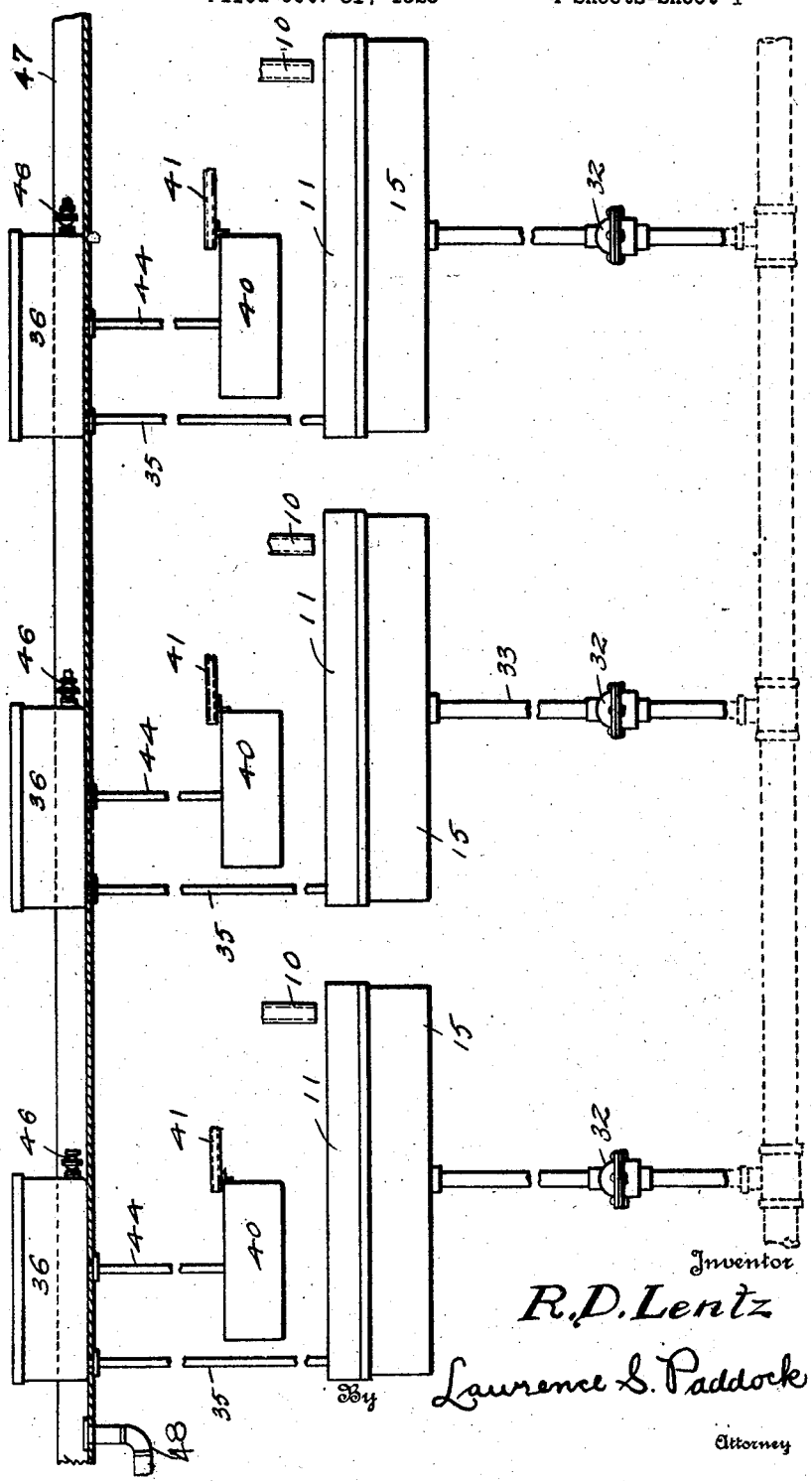

July 6, 1926.
R. D. LENTZ
1,591,135
AUTOMATICALLY OPERATING MECHANISM FOR ELEVATING LIQUIDS
Filed Oct. 31, 1925
4 Sheets-Sheet 2
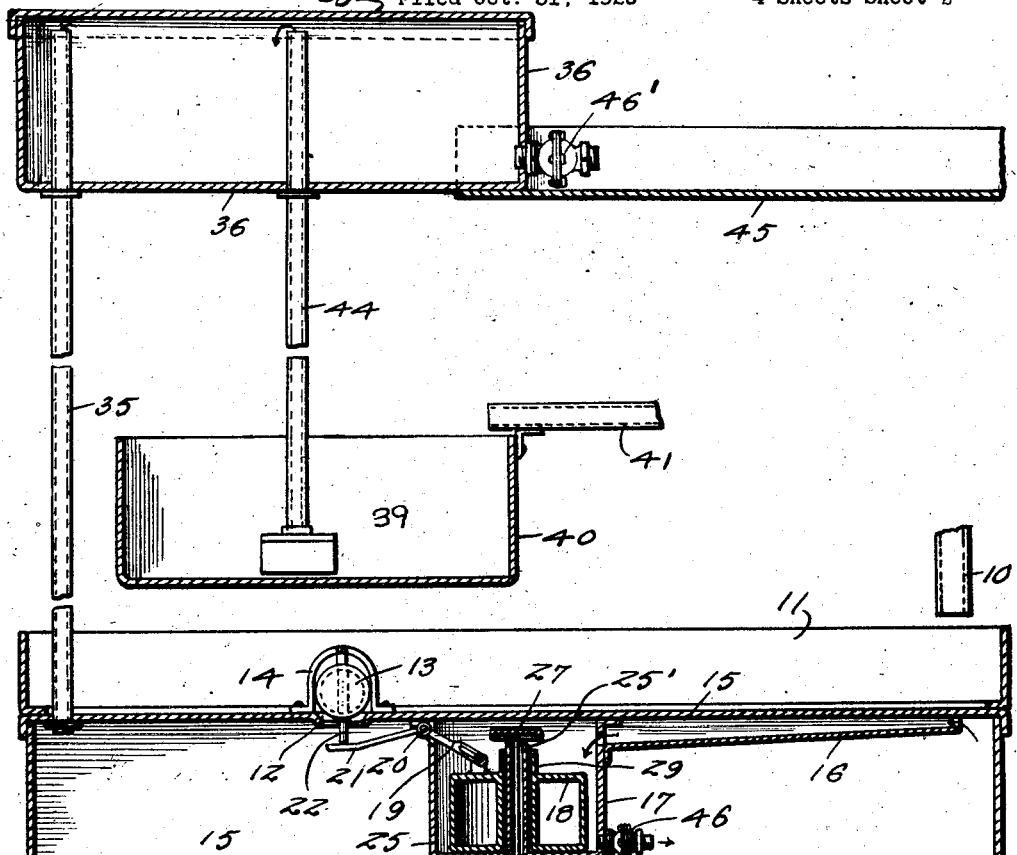
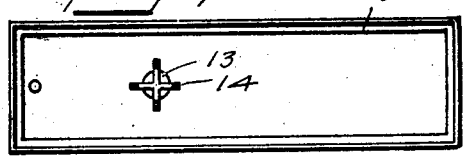
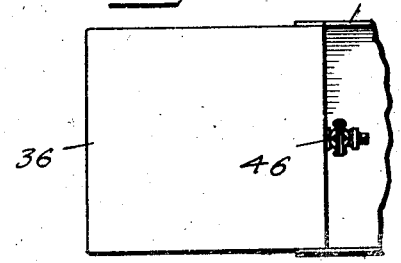
Inventor
R. D. Lentz
Lawrence S. Paddock
Attorney July 6, 1926.  1,591,135

R. D. LENTZ

AUTOMATICALLY OPERATING MECHANISM FOR ELEVATING LIQUIDS

Filed Oct. 31, 1925  4 Sheets-Sheet 3

Inventor
R. D. Lentz
By Lawrence S. Paddock
Attorney

July 6, 1926.　　　　　　　　　　　　　　　　　　1,591,135
R. D. LENTZ
AUTOMATICALLY OPERATING MECHANISM FOR ELEVATING LIQUIDS
Filed Oct. 31, 1925　　　　4 Sheets-Sheet 4

Fig. 3.

Inventor
R. D. Lentz,
By Lawrence S. Paddock
Attorney

Patented July 6, 1926.

1,591,135

UNITED STATES PATENT OFFICE.

REA D. LENTZ, OF LOS ANGELES, CALIFORNIA.

AUTOMATICALLY-OPERATING MECHANISM FOR ELEVATING LIQUIDS.

Application filed October 31, 1925. Serial No. 66,006.

This invention relates to means for elevating water or other liquid from a lower level to a higher level, more particularly the invention relates to an apparatus for this purpose which utilizes a source of water having a moderate fall to elevate a liquid to a desired height and accomplishes this by the provision of a simple and automatically operating apparatus which may be easily installed in the desired position and adapted to elevate water to a desired height from which it may be distributed for subsequent use.

An object of my invention is to provide an apparatus capable of elevating water or other liquid to a higher level by the utilization of the fall of a body of water or other liquid through a moderate distance and to accomplish this object in an automatic and continuous manner without assistance from outside sources of power.

A further object of my invention is to provide an apparatus which will intermittently produce a vacuum or condition of rarefied air pressure in a closed receptacle situated in an elevated position so as to cause water or other liquid to flow into the same from a lower level and be automatically and intermittently discharged therefrom to storage at the elevated position.

A further object is to provide an apparatus in which the vacuum-producing portion may be located at any convenient place where a moderate fall of water or other liquid is available and produce the desired vacuum in a closed receptacle located in proximity to the body of liquid it is desired to elevate.

A further object is to automatically control the operation of the vacuum-producing elements by mechanism responsive to the level of the liquid therein which will be alternately collected and discharged to a lower level, thus producing a desired vacuum by the evacuation of the liquid and its descent to the lower level.

A further object is to provide a battery of elevating units arranged so as to elevate a large volume of liquid to a desired level or if desired to provide a construction wherein a certain volume of liquid is successively elevated to higher levels.

Further objects will appear hereinafter in the following detailed description.

In the drawings Fig. 1 is a side elevation of a battery of my elevating units discharging liquid into a single reservoir at an elevated position.

Fig. 2 is a cross-section of one of my elevating units.

Fig. 3 is a side elevation of a battery of my elevating units arranged so as to elevate a quantity of liquid to successively higher levels.

Fig. 7 is a plan view of the tank 15.

Fig. 8 is a plan view of the tank 36.

Figure 4:
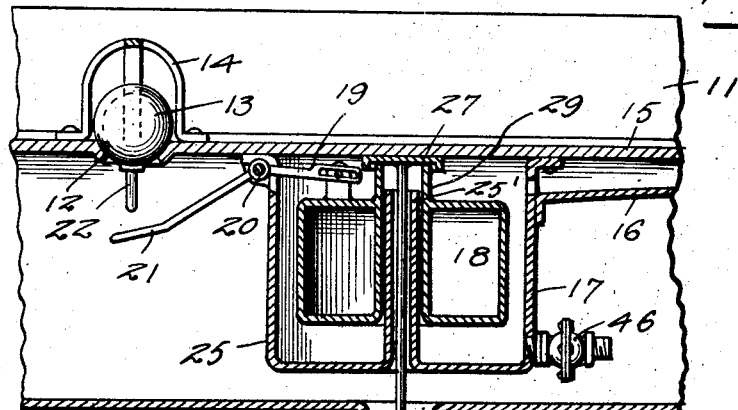
Fig. 4 is a cross-section of the vacuum-producing elements with portion thereof broken away.
Figure 5:
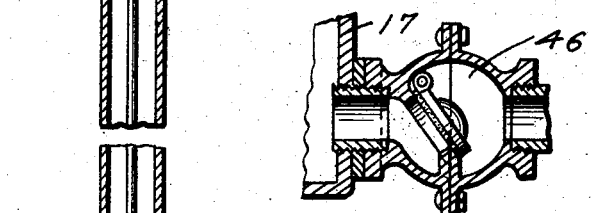
Fig. 5 is an enlarged cross-sectional view of the outlet valve 6 including a portion of the wall of the chamber 17.
Figure 6:
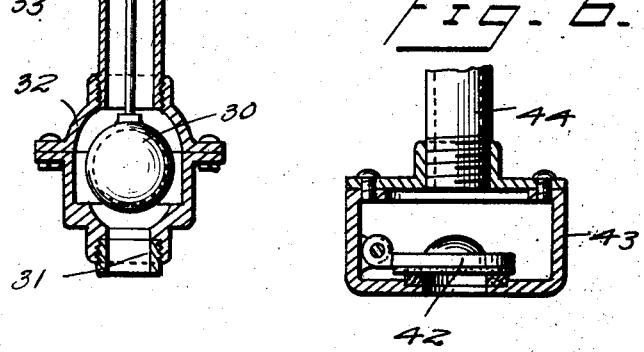
Fig. 6 is an enlarged view partly in cross-section of the valve 42 and casing 43.

In the drawings a supply of water or other liquid at a moderate elevation is delivered through a supply conduit 10 into an open tank 11. The tank 11 is provided with an outlet 12 in which is located a valve 13 which is held in operative position by a cage 14. Beneath the open tank 11 is located a closed tank or receptacle 15 into which the outlet 12 opens. A channel member 16 is located in the upper portion of the tank 15, as shown, and is provided with an inlet at its extreme right-hand end in close proximity to the top of the tank 15. Centrally located in the tank 15 is a chamber 17 having an inlet at its upper end opening into the left-hand end of the channel 16. The channel 16 has a sloping form and acts as a reservoir which is filled from the inlet at the high right end and discharges through the lower outlet at the left hand end into the chamber 17. Within the chamber 17 is located a float 18. A slotted arm 19 is operatively attached to the float 18 and is pivoted at 20. The arm 19 is provided with an extending portion 21 which is adapted to engage the stem of the valve 13. The rise of the float 18 permits the fall of the valve 13 with the consequent closing of the outlet 12 and the fall of the float raises the valve 13 thereby opening the outlet 12. The float 18 operates on a tubular member 25' having a fluid-tight connection with the bottom of the chamber 17. The tubular member 25' is adapted to receive one end of a rod 26 which carries a head 27 which is engaged by an annular element 29 on the float. The engagement of the head 27 by the annular element 29 occurs just after the valve 13 has closed the outlet 12. A valve 30 is attached to the lower end of a rod 26 and is seated at the outlet 31 of a chamber 32. The chamber 32 is connected by a pipe 33, through which the rod 26 passes, to an outlet 34 in the bottom of the chamber 15.

From the top of the tank 15 a pipe 35 leads to a point 37 within the tank 36 in proximity to the top thereof. The tank 36 is closed at the top by a fluid-tight cover 38, as shown.

The liquid 39 to be elevated is fed into a tank 40 through a pipe 41. The tank 40 may be located at any desirable position but must be at a higher level than the discharge end 31 of the pipe 33. A foot valve 42 and chamber 43 are located in the bottom of the tank 40. The chamber 43 is connected by a pipe 44 to the interior of the chamber 36 at a point near the top thereof. In practice it has been found desirable that the vertical distance from the level of the tank 15 to the discharge end of the pipe 33 be greater than the vertical distance from the level of the tank 36 to the level of the tank 40.

An open tank 45 is located in proximity to the tank 36. An outlet controlled by a check valve 46' permits the discharge of liquid from the tank 36 into the tank 45.

Referring to Fig. 2 the operation is as follows:

Water or any other liquid is discharged through the pipe 10 into the tank 11, the valve 13 being in raised position the liquid will pass into the tank 15. When the liquid has risen to the level of the inlet to the channel 16 it will pass through this channel into the chamber 17. As the liquid level rises in the chamber 17 the float 18 will rise correspondingly and this rising motion of the float will lower the extending portion 21 of the connected arm 19 thus permitting the valve 13 to close the outlet 12. The water which is stored in channel 16 will continue to flow into the chamber 17 after the valve 12 is closed thus causing the float 18 to continue its rising movement. Subsequently, upon the further rising of the float 18 the annular element 29 thereon will engage the head 27 on the rod 26 and lift the valve 30 whereupon the liquid in the tank 15 will be discharged to the pipe 33. The water in channel 16 continues to flow into the chamber 17 keeping the float 18 and valve 30 raised until the water has been nearly exhausted from the tank 15. The restricted outlet from the chamber 17 prevents a rapid discharge of the water from the chamber 17 and thus regulates the speed of the downward movement of the float so that the tank 15 will be entirely exhausted before the valve 30 is closed. The discharge of the liquid from tank 15 through the pipe 33 to a lower level produces a vacuum or rarefied atmospheric condition in the tanks 15 and 36. The vacuum thus produced causes a rise of liquid from tank 40 through the pipe 44, which liquid discharges into the tank 36 and substantially fills the same. The liquid then passes from the tank 36 to the open tank 45 from whence it may be discharged from this elevation and used for any desirable purpose such as power or water supply systems.

As the level of the liquid in the tank 15 falls it also falls in chamber 17 by reason of its discharge through the outlet valve 46. The downward movement of the float 18 following the falling level of the liquid in the chamber 17 actuates lever 19 so as to raise the extending portion 21 which contacts with the stem 22 of the valve 13 and raises this valve, thus allowing the liquid in the tank 11 to flow into the tank 15 and fill it, as heretofore described. The size of the outlet from the chamber 17 and valve 46 are so proportioned as to cause the fall of the liquid in the chamber 17 to be so timed as to actuate the valve 13 at the proper moment in the cycle of operation. In operation the discharge of the liquid from the tank 15 and pipe 33 will occur before the valve 13 is open. Refilling of the tank 15 then commences and the described operations are repeated periodically in an automatic manner. The refilling of the tank 15 expels the air therein into the tank 36 and assists in the expulsion of the liquid therein into the tank 45.

In Fig. 1 I have shown a plurality of units having their tanks 36 discharging into a common large reservoir 47, from whence the liquid is discharged for the desired utilization through an outlet 48. The number of units may be varied as desired, and their proportions may be varied to meet the desired requirements. In this manner any desired amount of liquid may be elevated to the level of reservoir 47 and held therein for subsequent use.

In Fig. 3 I have shown a plurality of units with the tanks 36 and 45 mounted at successively higher levels. In this construction the liquid is drawn from the lower tank 40 into the first tank 36 and discharged into its connected tank 45. From this first tank 45 the liquid is elevated into the second next higher tank 36 and discharged into its tank 45 from whence it is elevated into the third next higher tank 36 and discharged into its tank 45. By this construction the liquid from tank 40 may be elevated in steps to the desired level.

The number of units and stages of elevation may be multiplied to meet the desired requirements. The cycle of operation of each separate unit is accomplished in substantially the same amount of time and the tanks 45 are of such capacity as to assure a supply of liquid therein to furnish the proper quantity to the next higher tank 36 when the vacuum is formed therein. In operation it is desirable that the capacity of the tanks 45 in this construction be greater than the amount drawn therefrom at any one time. In starting up they will be filled by setting the units in operation successively commencing with the unit feeding the lower tank. In this manner the periods of elevation may vary without depletion of a supply of liquid in any tank 45 at a time when the adjacent unit is in the elevating portion of its cycle.

My apparatus has a wide variety of uses. Water may be pumped from sea level by taking advantage of the fall created by the ebb and flow of the tide and the movements of the waves by collecting water from the peaks thereof and transporting to storage. The elevated water may be used for domestic consumption, fire protection or power purposes. Waste water or surface drainage, mine drifts or sewers having a moderate amount of fall and sufficient volume may be used. I have found, under ordinary circumstances, that it requires only a moderate degree of fall to permit the pumping of fresh water from creeks, springs and ponds to a desired location. Water may also be pumped from cellars and from excavations. The mechanism is simple and automatic in its operation and does not require the expense for fuel and attention as in the case of thermally operated engines. I have found that in operation it is very economical and efficient.

Having described my invention, what I claim is:

1. In a device of the class described the combination of a closed receptacle provided with an inlet and a valve adapted to control said inlet, a discharge outlet for said receptacle, a controlling valve for said outlet, means for supplying a liquid to said receptacle through said inlet, a closed chamber positioned within said receptacle provided with an inlet at the top thereof at a position near the top of said receptacle and an outlet at the bottom thereof opening into said receptacle, a float mounted in said chamber, means operated by said float adapted to actuate said inlet and outlet valves and means for supplying a liquid to said closed chamber through said inlet therein so as to actuate said float.

2. In a device of the class described the combination of a closed receptacle provided with an inlet, a valve adapted to control said inlet, a discharge outlet for said receptacle, a controlling valve for said outlet, means for supplying a liquid to said receptacle through said inlet, a closed chamber positioned within said receptacle provided with an inlet near the top thereof and an outlet at the bottom thereof opening into said receptacle, a liquid-conducting means connected to said inlet and extending to a point adjacent to the top of said closed receptacle, a float mounted in said chamber and means operated by said float adapted to actuate said inlet and outlet valves.

3. In a device of the class described the combination of a closed receptacle provided with an inlet, a valve adapted to control said inlet, means for supplying a liquid to said receptacle through said inlet, a closed chamber positioned within said receptacle provided with an inlet near the top thereof and an outlet near the bottom thereof opening into said receptacle, a float mounted in said chamber, a pivoted member actuated by said float adapted to operate said inlet valve, means connected to said outlet valve having a portion thereof lying in the path of the movement of said float so as to be contacted thereby to open said outlet valve when the liquid level in said chamber has raised said float to its upper position and means for supplying a liquid to said closed chamber through said inlet therein so as to actuate said float.

4. In a device of the class described the combination of a closed receptacle provided with an inlet, a valve adapted to control said inlet, a discharge conduit extending downwardly from said receptacle and having a valve controlling the outlet at the outer end thereof, means for supplying a liquid to said receptacle through said inlet, a closed chamber positioned within said receptacle provided with an inlet near the top thereof and an outlet near the bottom thereof opening into said receptacle, a float mounted in said chamber, a pivoted member actuated by said float adapted to operate said inlet valve, a rod connected to said outlet valve and extending through said discharge conduit having a projection thereon at its upper end positioned in the path of the movement of said float so as to be contacted thereby to open said outlet valve when the liquid level in said chamber has raised said float to its upper position and means for supplying a liquid to said closed chamber through said inlet therein so as to actuate said float.

5. In a device of the class described, a lower closed tank, an open tank adapted to discharge a liquid thereinto, a pipe extending downwardly from said lower tank, means for automatically cutting off the flow of liquid to said closed tank responsive to the liquid level therein, means controlled by said automatic means for opening and closing lower end of said pipe, the automatic means including a float, a float chamber separated from the tank first named, a duct extending from the upper part of the tank first named to the float chamber for conducting a liquid to said float chamber, an upper closed tank and an air pipe extending thereinto from the tank first named, a receptacle receiving liquid to be elevated, and a pipe for conducting liquid from this receptacle to the upper tank, when the air pressure is reduced therein by the discharge of liquid from the lower tank.

6. In a device of the class described, in combination, a series of units including a series of closed receptacles located at successively higher levels, means utilizing the flow of a liquid to produce a vacuum in said closed receptacles, means adapted to utilize said vacuum to raise a liquid and supply it to the lowest closed receptacle of said series of closed receptacles from a lower level, a receiving receptacle for each of said closed receptacles located at successively higher levels and adapted to receive liquid from said closed receptacles, means for discharging liquid by gravity from said closed receptacles into said receiving receptacles and means adapted to utilize said vacuum to raise said discharged liquid in said receiving receptacles and introduce it into a higher closed receptacle of said series of closed receptacles.

In testimony whereof I affix my signature.

REA D. LENTZ.